July 18, 1944.  B. Y. JAMES  2,353,669
PACKAGE WRAPPING
Filed Jan. 2, 1942  6 Sheets-Sheet 1

INVENTOR.
Bill Yates James
BY
ATTORNEY.

INVENTOR.
Bill Yates James
BY
ATTORNEY.

July 18, 1944.  B. Y. JAMES  2,353,669
PACKAGE WRAPPING
Filed Jan. 2, 1942  6 Sheets-Sheet 3

INVENTOR.
Bill Yates James
BY
ATTORNEY.

July 18, 1944.   B. Y. JAMES   2,353,669
PACKAGE WRAPPING
Filed Jan. 2, 1942   6 Sheets-Sheet 4

INVENTOR.
Bill Yates James
BY
ATTORNEY.

July 18, 1944.  B. Y. JAMES  2,353,669
PACKAGE WRAPPING
Filed Jan. 2, 1942  6 Sheets-Sheet 5

INVENTOR.
Bill Yates James
BY
ATTORNEY.

July 18, 1944.  B. Y. JAMES  2,353,669
PACKAGE WRAPPING
Filed Jan. 2, 1942  6 Sheets-Sheet 6

INVENTOR.
Bill Yates James
BY
ATTORNEY.

Patented July 18, 1944

2,353,669

UNITED STATES PATENT OFFICE 2,353,669

PACKAGE WRAPPING

Bill Y. James, Miami, Okla., assignor of one-half to Caroline Y. James, Miami, Okla.

Application January 2, 1942, Serial No. 425,437

4 Claims. (Cl. 229—87)

This invention relates to packaging and has as its principal aim the provision of a pre-formed package wrapping which may be placed about a package of predetermined size and shape with a minimum amount of effort and labor.

Another object of this invention is the design of a package wrapping of the type as aforesaid which shall have a very pleasing and artistic appearance as well as incorporating therein the features above mentioned.

A further aim of this invention is embodied in a pre-formed wrapping with the characteristics described above, which forms a very compact, flat article before the same is placed in position on the package. This aim makes it possible for the article to be shipped and stored in considerable quantities in a small space and lends itself well to counter service.

The invention further contemplates a package wrapping having a unique series of folds, bends and plaits therein whereby the article may be manufactured from an initially flat sheet of paper and assembled to provide a wrapping having reinforced corners and a relatively high degree of structural strength.

This invention further results in an article which may be assembled on the package to be wrapped and secured in place without special tools, string or the usual appurtenances of the wrapping art. The parts of which this invention is comprised, are united and held in position by the structure and means incorporated in the article itself.

It is a yet further aim of this invention to provide wrapping means wherein all the folds thereof that are not made on the outer edges of the package are projected inwardly toward the package. Thus, it is contemplated that all the various areas of the package—top, side, ends and bottom, will lie closely adjacent the package since the folds on these surfaces project inwardly and not outwardly.

This invention also contemplates a package wrapping in the nature of a specially formed sack. This sack has a closed end formed in a special manner, as will be herein described, and an open end which has been pre-formed to the extent of having certain plaits, folds, creases, etc., made therein which greatly facilitates the realignment of the elements of the package wrapping to form another end for completing the enclosure of the article to be wrapped.

In the species of the invention shown in Figs. 1 to 6 inclusive, 40 is a quadrangular blank having attached thereto, contiguous therewith, and at opposite ends thereof, end walls 42. Adjacent end walls 42 and continguous therewith, are top walls 44. Crease 43 is formed by creasing wall 42 inwardly along the line of juncture thereof with said blank 40, said line being designated as AA'. Turn 45 is formed by turning top wall 44 inwardly at its line of juncture with end walls 42, said line of juncture being designated BB'.

Attention is directed to the fact that all inward turns, creases, etc., are designated by solid lines; where it is necessary to indicate an outward crease, turn, etc., the same will be designated on the drawings by means of a broken line.

Walls 42 and 44 have attached thereto, along the lateral edges thereof, members 46. It is to be noted that Fig. 6 comprises two similar sets of contiguous end and side walls 42 and 44 respectively. Each set has attached thereto along each of its two lateral edges, corresponding members 46. The set to the right of the drawings is geometrically similar to the set on the left with the exception of the projections 72 attached to the former.

Figure 6:
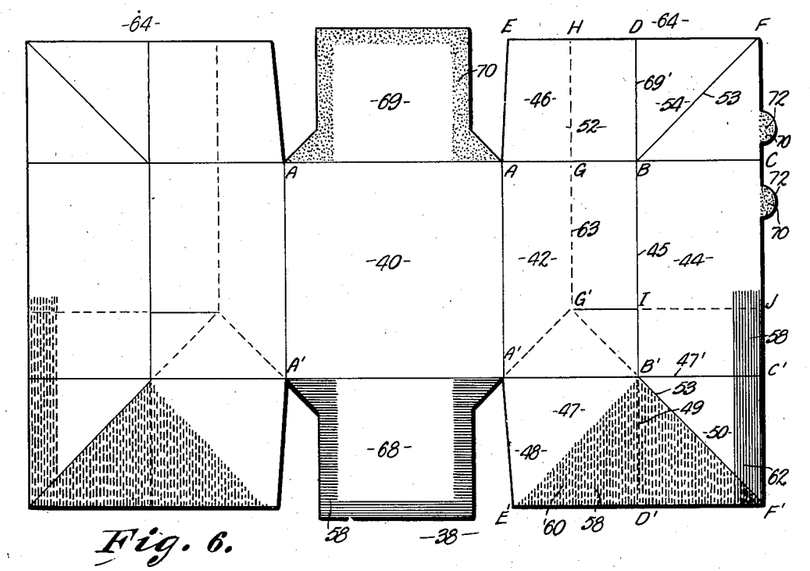
Fig. 6 is a stretch-out view of a form incorporated in a modification of the invention.

Figs. 9, 12, 15, 18, 21, 24, 27, 30 and 33 are partial stretch-out views showing only a portion of blank 40 and a single section 64, as aforesaid. Since each section 64 is identical, the disclosure of the construction of one of them from a form 38, suffices to illustrate the method of construction. In Fig. 6 the line of juncture between walls 42, 44 and member 47 is designated by line A'C', said member 47 being plaited inwardly from walls 42 and 44 to form plait 47'. Member 47 is bent outwardly along the transverse median B'D' thereof, the bend B'D' being contiguous but opposed to the turn 45 along line BB', the intersection of said turn 45 and said bend 49 being designated as point B'. The outward bend B'D' of member 47 along line B'D' serves to divide member 47 into a quadrangular part 48 and a quadrangular portion 50, the part 48 being adjacent the end 42 and the portion 50 being adjacent the top 44.

Portion 50 has a diagonal flexion 53 extending to the free corner of member 47 from point B', the same being made on line B'F' of portion 50.

The flexing of portion 50 inwardly along the line F'B' is continued until the corresponding areas E'D'B' and F'D'B' respectively are in contact.

When member 47 is positioned as above described, walls 42 and 44 adjacent thereto, are at right angles to one another, and side wall 56 is formed from member 47. Areas E'D'B' and F'D'B' are secured together by means of adhesive 58. This adhesive is on the outside 60 of form 38 as shown and is adapted to secure said areas in engagement as aforesaid.

The placing of adhesive 58 on the outside 60 of form 38 is indicated by means of the broken patch lines, as shown in the drawings. The placing of adhesive on the inside 62 of form 38 is indicated by means of unbroken patch lines.

The wall 56 thus formed is brought adjacent to the corresponding wall 56 formed of opposed sections 64 in like manner as aforesaid.

Flaps 68, joined to the other opposite sides of blank 40 along line A'A' respectively, and contiguous therewith, is plaited inwardly at the point of junction therewith.

Flap 68 carries on the free marginal edge thereof adhesive 58 which secures it to the wall 56 when the same has been formed as aforesaid. Thus, opposed cover sections 64 are fixedly secured in place at the closed end of the wrapper. In order that sections 64 may be secured more firmly, adhesive 58 extends inwardly for a short distance along the outer marginal edges of top walls 44.

The following plaits, flexions, etc., are made in the wrapping in a manner as will be described to form a side wall 59. However, the elements so formed are not secured together, but are restored to their respective positions as of this present stage of forming the wrapping as specified, whereby one end of the sack wrapper will be left open. This open end will thus be preformed to the extent of having the appropriate plaits, flexions, etc., made therein, and the same may be easily re-formed when the article to be wrapped is placed within the wrapping.

Member 46 is plaited inwardly from walls 42 and 44 along line AC. Member 46 is bent outwardly along the transverse median BD thereof, the bend BD being contiguous with the turn 45 along line BB', the intersection of said line and said turn being designated as point B. The inward bend 69' of member 46 along line BD serves to divide member 46 into a part 52 and a portion 54; the part 52 being adjacent the end 42 and the portion 54 being adjacent the top 44.

Portion 54 has an inwardly flexed diagonal flexion 53 made on line FB thereof. Flexing is continued until the areas FDB and FBC are in contact engagement and the former overlaps the latter. These areas will then lie outside of and adjacent to part 46. Side walls 59 thus formed are adapted to be secured together by means of flap 69.

Flap 69 is plaited along line AA and lies outside of but adjacent to the side walls 59 when the same are in operative position. Flap 69 carries a gum mixture 70 at the free marginal edge thereof, and when the article to be wrapped is properly positioned, this gum mixture 70 may be moistened to secure the flap to walls 59.

Projections 72 have gum mixture 70 thereon and the same will serve to attach projections 72 to adjacent top wall 44 and side walls 56. Gum mixture 70 is placed on the inside of form 38 and is designated by stippling in the drawings.

Figures 1, 2, 3, 4, 5:
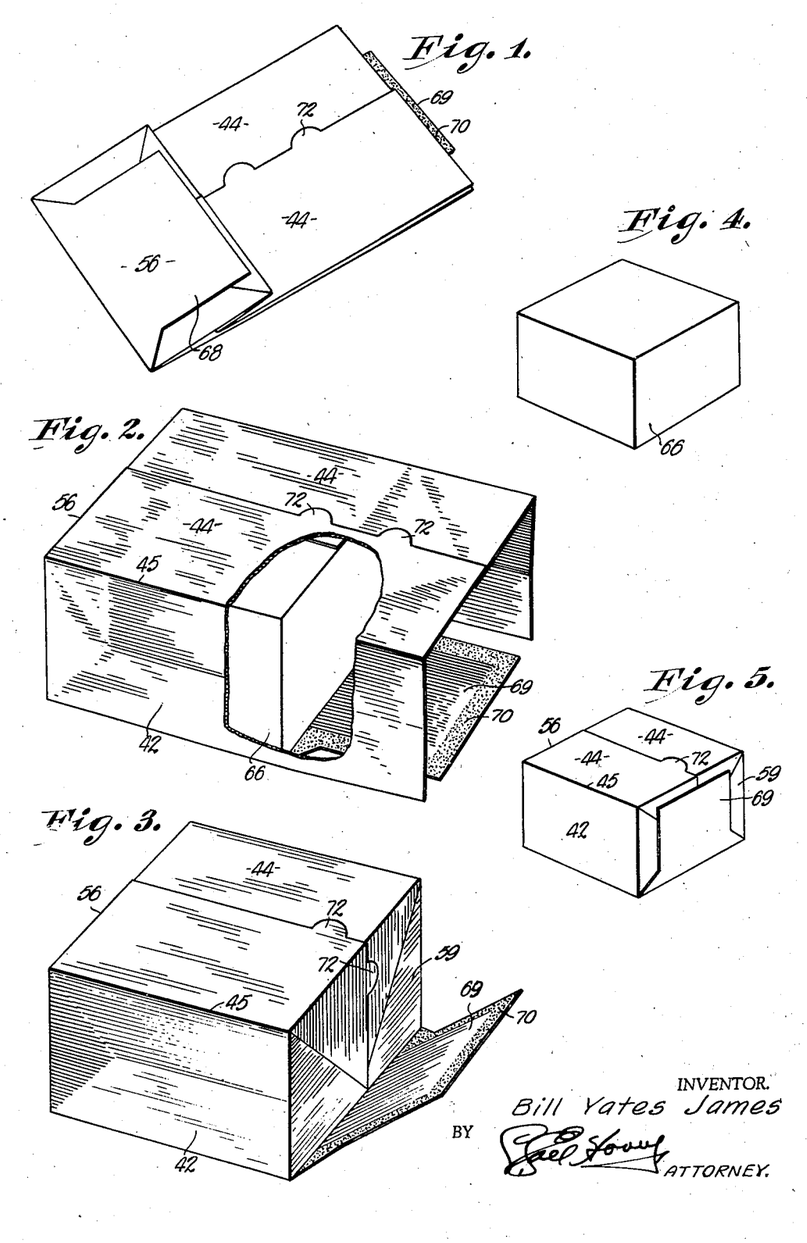
Fig. 1 is a perspective view of the form of package wrapping when the same is folded for storage.
Fig. 2 is a perspective view of the form of the package wrapping when the same is partially unfolded, preparatory to use thereof, and partially positioned with respect to the article being wrapped.
Fig. 3 is a perspective view of the package wrapping and article to be wrapped, the former being partially in place on the latter, with all the elements thereof being positioned to engage the latter previous to the placing of a flap in closed position.
Fig. 4 is a perspective view of the article to be wrapped.
Fig. 5 is a perspective view of the wrapping after being positioned on the article.

In order that the package wrapping will fold flat as shown in Fig. 1, it is necessary to restore side walls 59 and flap 69 to their original position. An outward crook 63 on line GG' is then incorporated in each cover section 64. Outward crook GH is contiguous with crook 63. Diagonal outward crooks G'A' and G'B' are formed in end wall 42 as shown.

Inward crook G'I and outward crook IJ permit the positioning of side wall 56 adjacent the top wall 44 as shown in Fig. 1.

When so positioned area EA'G'H and area DIG'H will lie adjacent and in contact with each other. Area IB'G' and area IB'C'J will be in contact with the adjacent portions of end wall 42 and top wall 44 respectively.

In order to use the wrapping all that is necessary is that it be restored to its former position previous to folding the same flat for storage.

Figure 7:
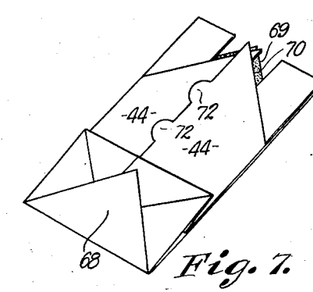
Figs. 7, 10, 13, 16, 19, 25, 28 and 31 are perspective views of the modifications illustrated in Figs. 9, 12, 15, 18, 21, 27, 30 and 33 respectively, the same being in folded condition for storage.
Figure 8:
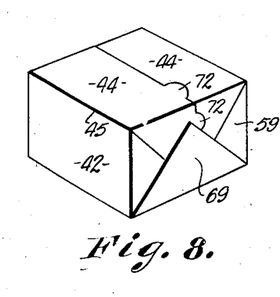
Figs. 8, 11, 14, 17, 20, 23, 26, 29 and 32 are perspective views of the modifications illustrated in Figs. 9, 12, 15, 18, 21, 24, 27, 30 and 33 respectively, the same being in package-encasing condition.
Figure 9:
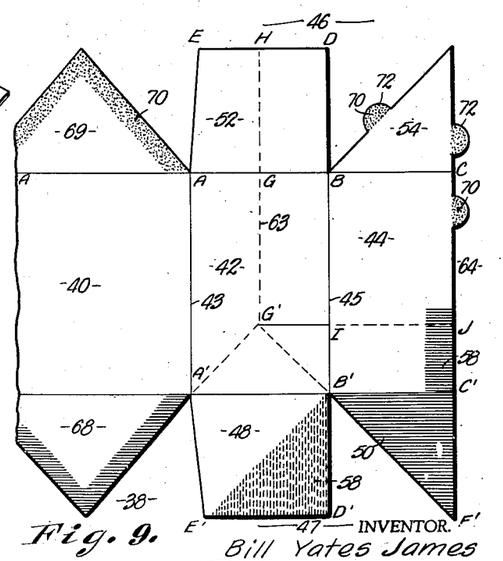
Figs. 9, 12, 15, 18, 21, 24, 27, 30 and 33 are partial stretch-out views of modifications of several forms used in making the wrapping.

Figs. 7, 8 and 9 illustrate another modification of the invention. This modification (Fig. 9), shows a portion of the quadrangular blank 40 having attached thereto, contiguous therewith, and at the opposite edges thereof, end walls 42. Adjacent end walls 42 and contiguous therewith are top walls 44. Crease 43 is formed by creasing wall 42 inwardly along the line of juncture thereof with said blank 40, said line being designated as AA'. Turn 45 is formed by turning top wall 44 inwardly at its line of juncture with end wall 42, said line of juncture being designated as BB'.

Walls 42 and 44 have attached thereto along the lateral edges thereof members 46 and 47. The line of juncture between walls 42, 44 and member 47 designated as line A'C', said member 47 being divided at point B' into quadrangular part 48 and portion 50—part 48 being adjacent end 42 and portion 50 being adjacent top 44. When part 48 and portion 50 are plaited on line A'C', the latter overlies the former and is secured thereto by means of adhesive 58 to form an end wall 56. The wall 56 thus formed is brought adjacent to the corresponding wall 56 formed of opposed section 64 in like manner as aforesaid.

Flap 68, joined to the other opposite sides of blank 40, along line A'A' is contiguous therewith. Flap 68 carries on the free marginal edge thereof, adhesive 58 which secures it to wall 56 when the same has been formed as aforesaid. Opposed cover sections 64 are fixedly secured in place at the closed end of the wrapper. In order that sections 64 may be secured more firmly, adhesive 58 extends inwardly for a short distance along the outer marginal edges of top walls 44.

The following plaits, flexions, etc., are made in the wrapping in a manner as will be described.

to form a side wall 59. However, the elements so formed are not secured together but are restored to their respective positions as of this present stage of forming the wrapping as specified, whereby one end of the sack wrapper will be left open. This open end will thus be pre-formed to the extent of having the appropriate plaits, flexions, etc., made therein and the same may be easily reformed when the article to be wrapped is placed in the wrapping.

Member 46 is comprised of a part 52 and a portion 54, the part 52 being adjacent end 42 and portion 54 being adjacent top 44. Member 46 is plaited inwardly from walls 42 and 44 along line AC. Portion 54 overlies part 52 and forms a side wall 59.

Side walls 59 are adapted to be secured together by means of flap 69. Flap 69 is plaited along line AA and lies outside of but adjacent to side walls 59 when the same are in operative position.

Flap 69 carries a gum mixture 70 at the free marginal edge thereof and, when the article to be wrapped is properly positioned, this gum mixture 70 may be moistened to secure the flap to walls 59.

Projections 72 have gum mixture 70 thereon and the same will serve to attach projections 72 to the adjacent top wall 44 and side walls 56. Gum mixture 70 is placed on the inside form 38 and is designated by stippling, as shown in the drawings.

In order that the package will fold flat as shown in Fig. 7, it is necessary to restore side walls 59 and flap 69 to their original positions. An outward crook 63 on line GG' is then incorporated in each cover section 64. Outward crook GH is contiguous with crook 63. Diagonal outward crooks G'A' and G'B' are formed in the end wall 42 as shown. Inward crook G'I' and outward crook IJ permit the positioning of side wall 56 adjacent top wall 44 as shown in Fig. 1.

In so positioning, area EA'G'H and area D'G'H will lie adjacent and in contact with each other. Area IB'G' and area IB'C'J will be in contact with the adjacent portions of end wall 42 and top wall 44 respectively.

In order to use the wrapping, all that is necessary is that it be restored to its former position previous to folding the same flat for storage.

Figures 10, 11, 12:
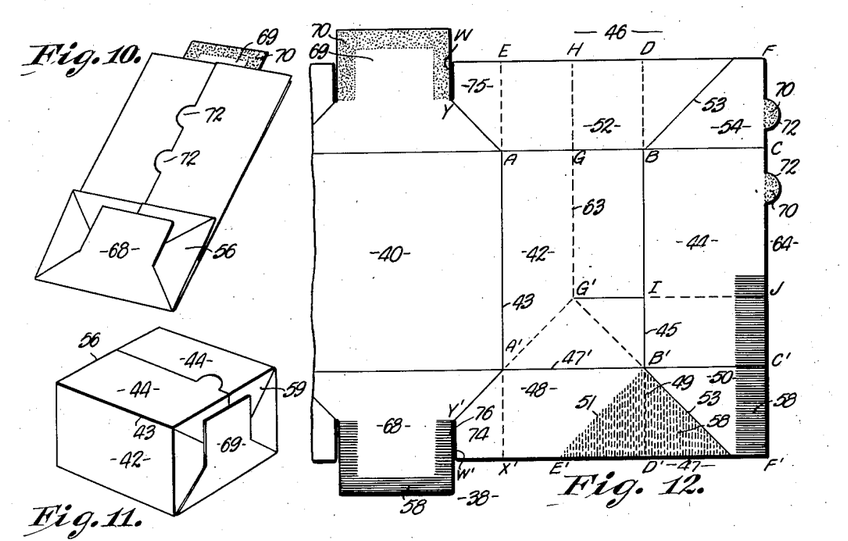

Figs. 10, 11 and 12 illustrate a modification of the invention. In this modification, Fig. 12 shows a quadrangular blank 40 having attached thereto, contiguous therewith, and at the opposite edges thereof, end walls 42. Adjacent end walls 42 and contiguous therewith are top walls 44. Crease 43 is formed by creasing wall 42 inwardly along the line of juncture with said blank 40, said line being designated as AA'. Turn 45 is formed by turning top wall 44 inwardly at its line of juncture with end wall 42, said line of juncture being designated as BB'.

A member 47 is formed along the transverse edges of walls 42 and 44. The line of juncture between walls 42, 44 and member 47 is designated by line A'C', said member 47 being plaited inwardly from walls 42 and 44 to form plait 47'.

Member 47 is bent outwardly along the transverse median B'D' thereof, the bend B'D' being contiguous but opposed to the fold 45 along line BB'—the intersection of said turn 45 and said bend B'D' being designated as point B'. The outward bend B'D' of member 47 along lines B'D' serves to divide member 47 into a quadrangular part 48 and a quadrangular portion 50, the part 48 being adjacent end 42 and the portion 50 being adjacent top 44. Part 48 and portion 50 have opposed diagonal flexions 51 and 53 extending to the edges of member 47 from point B', the same being made on lines E'B' and F'B' of part 48 and portion 50 respectively. The flexing of portion 50 inwardly and the flexing of part 48 outwardly along lines F'B' and E'B' respectively is continued until the corresponding areas E'B'D' and F'D'B' respectively are in contact.

When member 47 is positioned as above described, walls 42 and 44 adjacent thereto, will be at right angles to one another and side wall 56 will be formed from member 47. Areas E'D'B and F'D'B' are secured together by means of adhesive 58. This adhesive 58 is on the outside 60 of form 38 as shown, and is adapted to secure said areas in engagement as aforesaid. Wall 56 thus formed, is brought adjacent to the corresponding wall 56 formed of opposed section 64 in like manner as aforesaid.

Flap 68 is joined to the other opposite edges of blank 40 along line A'A' respectively, it is contiguous therewith, and is plaited inwardly at the point of junction therewith. Between flap 68 and member 47 is a quadrangular piece 74. This piece 74 has a free edge 76 co-extensive and adjacent flap 68 on line W'Y'. Piece 74 is contiguous with flap 68 on line A'Y' and with member 47 on line A'X', the same being crimped outwardly at the line of connection A'X' with said member 47, and inwardly at the line of connection A'Y' with the flap 68. Thus, side wall 56 is formed having the reinforcing piece 74 adjacent thereto. Flap 68 carries at the free marginal edge thereof adhesive 58 which secures it to wall 56 when the same has been formed as aforesaid—these opposed cover sections 64 are fixedly secured in place at the closed end of the wrapper.

In order that sections 64 may be secured more firmly, adhesive 58 extends inwardly for a short distance along the outer marginal edges of top wall 44.

The following plaits, flexions, etc., are made in a manner as described, to form a side wall 59. However, the elements so formed are not secured together, but are restored to their respective positions as of this present stage of forming the wrapping specified, whereby one end of the sack wrapper will be left open. This open end will thus be pre-formed to the extent of having the appropriate plaits, flexions, etc., made therein and the same may be easily reformed when the article to be wrapped is placed within the wrapping.

Member 46 is plaited inwardly from walls 42 and 44 along line AC. Member 46 is bent outwardly along the transverse median BD thereof—the bend BD being contiguous with the fold 45 along line BB'—the intersection of said line and said fold being designated as point B. The outward bend BD of member 46 along line BD serves to divide member 46 into part 52 and portion 54—part 52 being adjacent end 42 and portion 54 being adjacent top 44. Portion 54 has an inwardly flexed diagonal flexion 53 made on line FB thereof. Flexing is continued until the area FDB and FBC are in contact engagement and the former overlaps the latter. These areas will then lie outside of and adjacent to area 46. Side walls 59 thus formed, are adapted to be secured together by means of flap 69. Flap 69 is plaited along line AA and lies outside of but adjacent to the side walls 59 when the same are in operative position. Flap 69 carries a gum mixture 70 at the free marginal edge thereof and with the article to be wrapped properly positioned, this gum mixture 70 may be moistened to secure the flap to walls 59.

Projections 72 have gum mixture 70 thereon and the same will serve to attach projections 72 to adjacent top wall 44 and side walls 56. Gum mixture 70 is placed on the inside of form 38 and is designated by stippling the drawings.

In order that the package wrapping will fold flat as shown in Fig. 10, it is necessary to restore side walls 59 and flap 69 to their original positions. An outward crook 63 on line GG' is then incorporated in each cover section 64. Outward crook GH is contiguous with crook 63. Diagonal outward crooks G'A' and G'B' are formed in end wall 42 as shown. Inward crook G'I and outward crook IJ permit the positioning of side wall 56 adjacent top wall 44 as shown in Fig. 10. When so positioned area EA'G'H and area DIG'H will lie adjacent and in contact with each other. Area IB'G' and area IB'C'J will be in contact with the adjacent portions of end wall 42 and top wall 44 respectively.

In order to use the wrapping, all that is necessary is that it be restored to its former position previous to folding the same flat for storage.

Line EA and line DB are folded back when the wrapper is in the condition shown in Fig. 10 and when in the condition shown in Fig. 11. The material is folded outwardly along these lines when manipulation occurs to form the wrapper shown in Fig. 11. The material is folded inwardly (in the opposite direction from that just mentioned), when the wrapper is manipulated to the form shown in Fig. 10.

Figures 13, 14, 15:
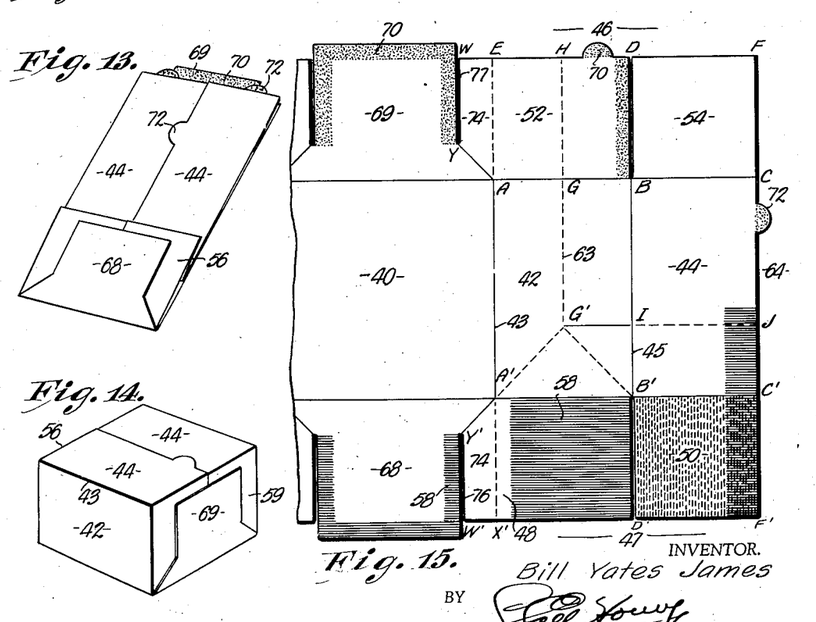

Figs. 13, 14 and 15 illustrate a modification of the invention. In this modification Fig. 15 shows a quadrangular blank 40 having attached thereto, contiguous therewith and at the opposite edges thereof, end walls 42. Adjacent end walls 42 and contiguous therewith, are top walls 44. Crease 43 is formed by creasing wall 42 inwardly along the line of juncture with said blank 40, said line being designated as AA'. Turn 45 is formed by turning top wall 44 inwardly at its line of juncture with end wall 42, said line of juncture being designated as BB'. These parts are secured together but are restored to their respective positions as of this present stage of forming the wrapping as specified, whereby one end of the sack wrapper will be left open. This open end will thus be pre-formed to the extent of having appropriate plaits, flexions, etc., made therein and the same may be easily reformed when the article to be wrapped is placed in the wrapping.

Member 46 is comprised of a part 52 and a portion 54, part 52 being adjacent end 42 and portion 54 being adjacent top 44. Member 46 is plaited inwardly from walls 42 and 44 along line AE. Part 52 overlies portion 54 and a side wall 59 is thereby formed. Part 52 has adhesive along the margin DB thereof for securing said part to portion 54 when the same are in operative position on the package. Side walls 59 are adapted to be secured together by means of flap 69. Flap 69 is plaited along line AA and likewise outside of but adjacent to side wall 59 when the same are in the operative position.

Flap 69 carries a gum mixture 70 at the free marginal edge thereof and when the article to be wrapped is properly positioned, this gum mixture 70 may be moistened to secure the flap to wall 59.

Between flap 69 and member 46 is a quadrangular piece 74. This piece 74 has a free edge 77 co-extensive and adjacent flap 69 on line AY and with member 46 on line AX, the same being crimped outwardly at the line of connection AX with said member 46, and inwardly at the line of connection AY with flap 69. Thus, side walls 59 when folded as above described, have reinforcing piece 75 adjacent thereto and therebetween said walls and flap 69.

Projections 72 are secured to the top wall 44 in the same manner as hereinbefore described. In order that the package wrapping will fold flat as shown in Fig. 13, it is necessary to restore side wall 59 and flap 69 to their original positions. An outward crook 63 on line GG' is then incorporated in each cover section 64. Outward crook GH is contiguous with crook 63. Diagonal outward crooks G'A' and G'B' are formed in end wall 42 as shown. Inward crook G'I, and outward crook IJ permit the positioning of side wall 56 adjacent top wall 44, as shown in Fig. 13. When so positioned, area EA'G'H and area DIG'H will be in contact and lie adjacent to each other. Area IB'G' and area IB'C'J' will be in contact with the adjacent portions of end wall 42 and top wall 44 respectively. To use the wrapping, it should be restored to its former position previous to folding the same flat before storing. Lines EA and HG are folded both outwardly and inwardly, in the same manner as above described with respect to the form shown in Fig. 12, when the wrapper is manipulated to create the condition thereof illustrated in Figs. 14 and 13 respectively.

Figures 16, 17, 18:
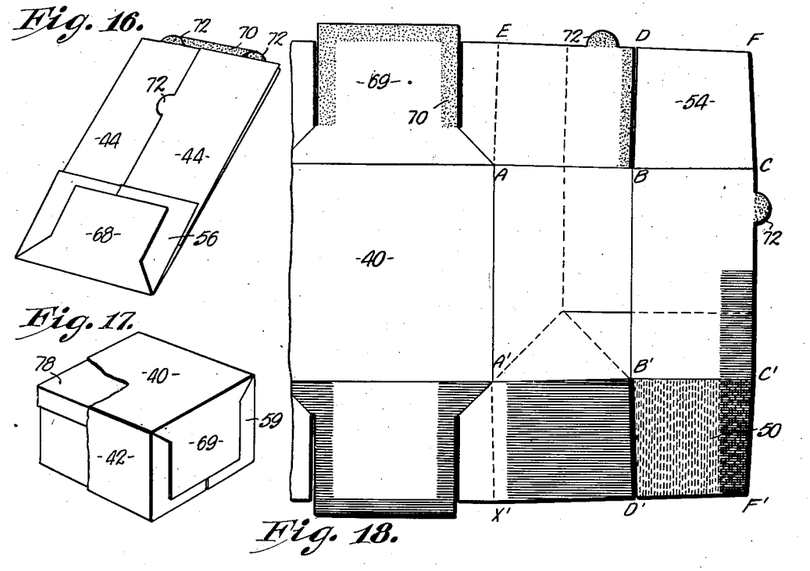
Figure 20:
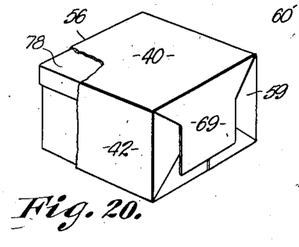

The form of invention illustrated in Figs. 16, 17 and 18 is exactly the same as the form illustrated in Figs. 13, 14 and 15, with the exception that the edges of the elements on lines FC, C'F', DB, B'D', EF, AC, A'C' and E'F' are tapered inwardly whereby said wrapper, when assembled as described in connection with Figs. 13, 14 and 15, will accommodate a container having larger dimensions at its top than at its bottom, such container as shown in Fig. 17 has an overlying lid 78 which increases the dimensions of the top of the box and necessitates the use of this form of taper. The edges on the lines as aforesaid, may be cut at any angle to accommodate the taper of a particular shape, likewise the shape of portions 50 and 54 may be altered to better accommodate such article. Form 47, as shown in the drawings, is proportioned to accommodate the article 78, shown in Fig. 20. Line EA is a line of fold used when forming the material to create the condition illustrated in both Fig. 16 and Fig. 17. The material is folded outwardly along this line when forming the wrapper to receive the container as shown in Fig. 17, and inwardly to cause the wrapper to assume the collapsed form shown in Fig. 16.

In the modification shown in Figs. 19, 20 and 21, 40 is a quadrangular blank having attached thereto, contiguous therewith and at the opposite edges thereof, end walls 42. Adjacent end walls 42 and contiguous therewith, are top walls 44. Crease 43 is formed by creasing wall 42 inwardly along the line of juncture thereof with said blank 40, said line being designated as AA'. Turn 45 is formed by turning top wall 44 inwardly with end wall 42 at its line of juncture, said line of juncture being BB'.

Figure 21:
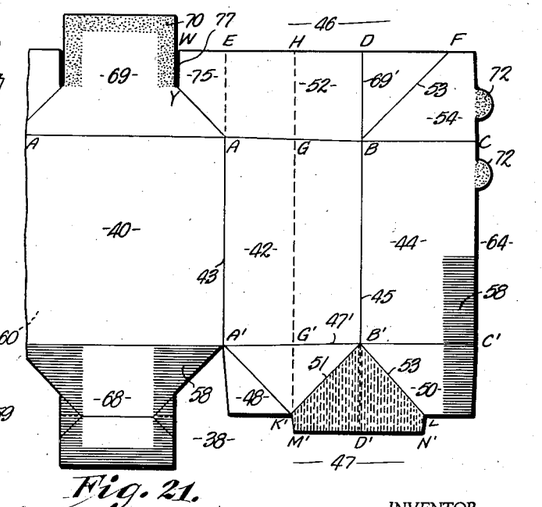

Walls 42 and 44 have attached thereto along the lateral edges thereof, members 46 and 47. The line of juncture between walls 42, 44 and member 47 is designated as line A'C', said member 47 being plaited inwardly from walls 42 and 44 to form plait 47'. Member 47 is bent outwardly along the transverse median B'D' thereof, the bend B'D' being contiguous but opposed to the turn 45 along line BB'—the intersection of said turn 45 and said bend 44 being designated as point B'. The outward bend B'D' of member 47 along line B'D' serves to divide member 47 into a quadrangular part 48 and a quadrangular portion 50, part 48 being adjacent end 42 and portion 50 being adjacent top 44.

Part 48 and portion 50 have opposed diagonal flexions 51 and 53 extending to the free corners of member 47 from point B', the same being made on the lines I'B' and L'B' respectively. It is to be noted that between points K' and L' on member 47 is an area which is an extension of member 47 edgewise. This edgewise extension serves as an added means of reinforcing the wrapping. The flexing of portion 50 inwardly and the flexing of part 48 outwardly along lines K'B' and L'B' respectively. It is to be noted that between points K' and L' on member 47 is an area which is an extension of member 47 edgewise. This edgewise extension serves as an added means of reinforcing the wrapping. The flexing of portion 50 inwardly and the flexing of part 48 outwardly along lines K'B' and L'B' respectively, is continued until the corresponding areas K'M'B'D' and L'N'D'B' respectively, are in contact.

When member 47 is positioned as above described, walls 42 and 44 adjacent thereto, are at right angles to one another and side wall 56 is formed from member 47. Areas K'B'D'M' and L'B'D'N' are secured together by means of adhesive 58. This adhesive is on the outside 60 of form 38 as shown, and is adapted to secure said areas in engagement as aforesaid. The wall 56 thus formed is brought adjacent to the corresponding wall 56 of opposed sections 64 in like manner as aforesaid.

This wrapper accommodates a container having larger dimensions at its top than at its bottom when the angles M'K'E', N'LF' are greater than 90° as shown, and the shape of part 48 and portion 50 are altered as described in connection with Figs. 16, 17 and 18. The angles and the shape of the elements are substantially as shown whereby the wrapper will fit an article of the shape shown in Fig. 20.

Flap 68 carries on the free marginal edge thereof adhesive 58 which secures it to the wall 56 when the same has been formed. Thus, opposed cover sections 64 are fixedly secured in place at the closed end of the wrapper. In order that section 64 may be secured more firmly, adhesive 58 extends inwardly for a short distance along the outer marginal edges of top walls 44.

Member 46 is plaited inwardly from walls 42 and 44 along line AC, member 46 is bent outwardly along the transverse median BD thereof, the bend BD being contiguous with the turn 45 along line B'D', the intersection of said line and said turn being designated as point B.

The inward bend 69' of member 46 along line BD serves to divide said member into a part 52 and a portion 54, part 52 being adjacent end 42 and portion 54 being adjacent top 44. Portion 54 has inwardly flexed diagonal flexion 53 made on line FB thereof, flexing is continued until the area FDB is in contact engagement with part 52. Thus portion 54 will overlap part 52 to form a side wall 59. Side walls 59 thus formed, are adapted to be secured together by means of flap 69.

Flap 69 is plaited along line AA and likewise outside of but adjacent to the side walls 59 when the same are in operative position. Between flap 69 and member 46 is a quadrangular piece 75. This piece 75 has a free edge 77 co-extensive and adjacent flap 69 on line A and adjoins flap 69 on line AY. Piece 75 adjoins member 46 on line AE, said piece 75 being crimped outwardly at the line of connection AX with said member 46, and inwardly at the line of connection AY with flap 69. Thus, side walls 59 when folded as above described, have reinforcing piece 75 adjacent thereto and therebetween said walls and flap 69.

Flap 69 carries gum mixture 70 at the free marginal edges thereof and said gum mixture may be moistened to secure the flap to walls 59. Projections 72 are again employed as hereinbefore described.

Figure 19:
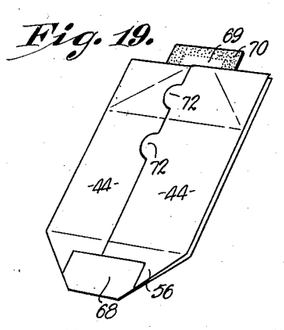

In order that the package wrapping will fold flat as shown in Fig. 19, it is necessary to restore side walls 59 and flap 69 to their original positions. An outward crook 63 on line GG' is then incorporated in each cover section 64. Outward crook GH and G'K' are contiguous with crook 63. Thus the wrapper may be collapsed by pressing the ends 42 inwardly and allowing said ends to be outwardly crooked on their median line HK' until said ends have been folded back upon themselves and the wrapper is in a collapsed position as shown in Fig. 19. The material is folded inwardly and outwardly along lines of fold EA and HG to cause the same to assume the condition shown in Figs. 19 and 20 respectively.

Figures 22, 23, 24:
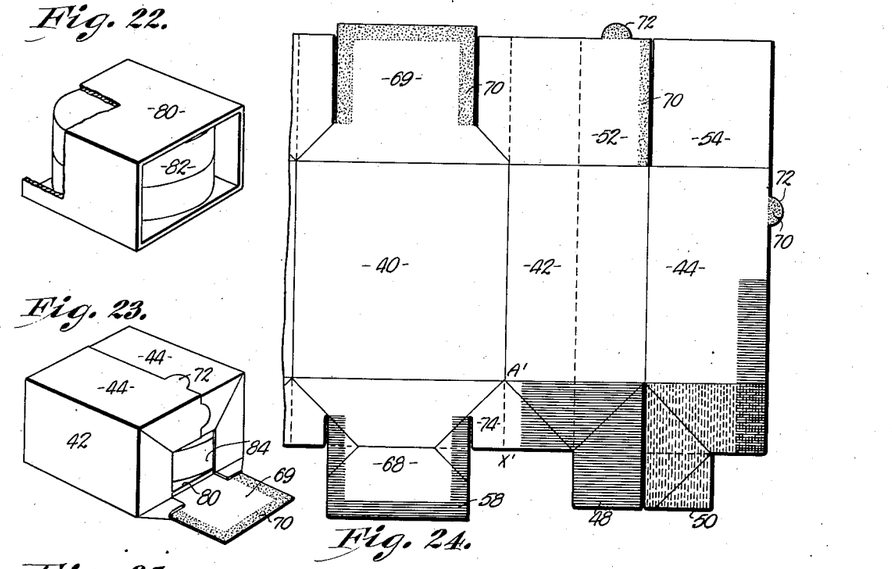
Fig. 22 is a perspective view of an adaptor surrounding an article of a configuration different from that for which the wrapping is designed.

The form of invention shown in Figs. 22, 23 and 24 is similar in the essentials of construction to the form shown in Figs. 13, 14 and 15, however, this form is specially designed to be used with an irregularly shaped package having an adaptor of specified dimensions placed thereon. Where round objects and the like are to be wrapped, it is a practice of the trade to place about said irregular package, a hollow, square-cornered adaptor in order to facilitate the wrapping of the article.

This adaptor 80 and irregularly shaped article 82 are shown in Fig. 22 with the article placed within the adaptor and a portion of the adaptor broken away to more clearly reveal article 82.

Fig. 23 shows the wrapping in place on the adaptor but with flap 69 in an extended position before the same has been sealed in order to reveal an opening 84 in the wrapping through which the article 38 has been cut so that when folded, openings 84 will be present therein; and further, the corners will be reinforced with a double thickness of material so as to better retain article 82 in place.

Fig. 24 shows a blank similar to that in Fig. 15 but the exterior free corners of part 48 and portion 50 have been removed therefrom, the length of the quadrangular piece 74 being the same as the shortest dimension of part 48 along line X'A'. Part 48 and portion 50 are positioned folded, etc., in the same manner as part 48 and portion 50 of Fig. 15. It is obvious that the shape of part 48 and portion 50 will result in an opening 84 as is shown in Fig. 23.

The package wrapping may be folded flat in the same manner as illustrated in Fig. 13. Part 52 and portion 44 are identical with the corresponding parts of Fig. 15 and are positioned folded etc., in the same manner as discussed in connection with the modification there shown.

Figure 25:
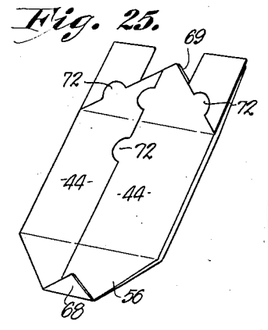
Figure 26:
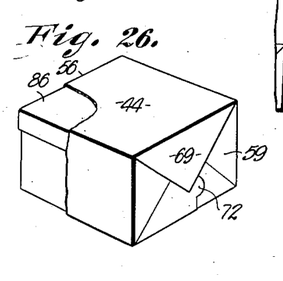
Figure 27:
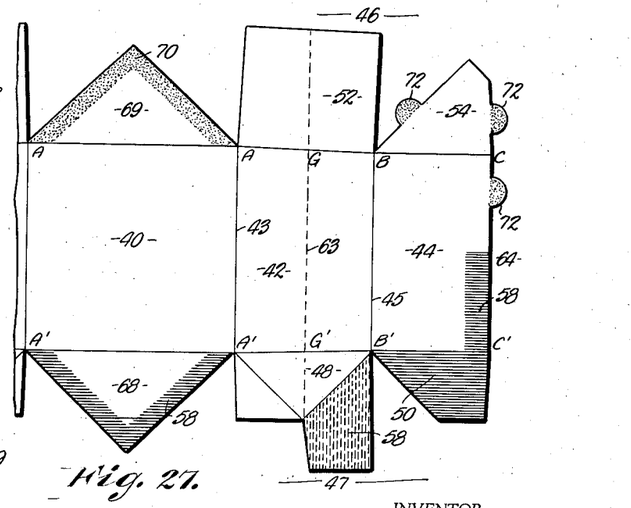

Figs. 25, 26 and 27 illustrate another modification of the invention. This modification (Fig. 27), shows a quadrangular blank 40 having attached thereto, contiguous therewith, and at the opposite edges thereof, end walls 42. Adjacent end walls 42 and contiguous therewith are top walls 44. Crease 43 is formed by creasing wall 42 inwardly along the line of juncture thereof with said blank 40, said line being designated as AA'. Turn 45 is formed by turning top wall 44 inwardly at its line of juncture with end wall 42, said line of juncture being designated as BB'.

Walls 42 and 44 have attached thereto along the lateral edges thereof members 46 and 47. The line of juncture between walls 42, 44 and member 47 is designated as line A'C', said member 47 being divided at point B' into part 48 and portion 50, part 48 being adjacent end 42 and portion 50 being adjacent top 44. When part 48 and portion 50 are plaited on line A'C', the latter overlies the former and is secured thereto by means of adhesive 58 to form an end wall 56. Wall 56 thus formed, is brought adjacent to the corresponding wall 56 formed of opposed sections 64 in like manner as aforesaid.

Flap 68 joined to the other opposite sides of blank 40 along line A'A' is contiguous therewith. Flap 68 carries on the free marginal edge thereof adhesive 58 which secures it to wall 56 when the same has been formed as aforesaid.

Opposed cover sections 64 are fixedly secured in place at the closed end of the wrapper. In order that 64 may be more firmly secured, adhesive 58 extends inwardly for a short distance along the outer marginal edges of top walls 44.

The following plaits, flexions, etc., are made in the wrapping in the manner as will be described to form a side wall 59. However, the elements so formed, are not secured together but are restored to their respective positions as of this present stage of forming the wrapping as specified, whereby one end of the sack wrapper will be left open. This open end will thus be pre-formed to the extent of having appropriate plaits, flexions, etc., made therein and the same may be easily reformed when the article to be wrapped is placed in the wrapping.

Member 46 is comprised of part 52 and portion 54, part 52 being adjacent end 42 and portion 54 being adjacent top 44. In this form, portions 54 and 50 are similar in shape, being designed to overlie certain portions of parts 52 and 48 respectively as shown in Fig. 27. This type of construction provides for reinforcement of the side wall at a point nearest the base where such reinforcement is most needed.

Member 46 is plaited inwardly from walls 42 and 44 along line AC. Portion 54 overlies part 52 and forms a side wall 59. Side walls 59 are adapted to be secured together by means of flap 69. Flap 69 is plaited along line AA and lies outside of but adjacent side walls 59 when the same are in operative position.

Flap 69 has gum mixture 70 at the free marginal edge thereof for purposes as aforesaid.

This wrapper accommodates a container having larger dimensions at its top than at its bottom when the shape of part 48 and portion 50 is as shown in the drawings, and discussed in connection with Figs. 16, 17 and 18.

In order that the package will fold flat as shown in Fig. 25, it is necessary to restore side walls 59 and flap 69 to their original positions. An outward crook 63 on line GG' is then incorporated in each cover section 64. Outward crooks GH and G'H' are contiguous with crook 63. The wrapping is collapsed by pressing end walls 42 inwardly so that the same are crooked outwardly along median line HH' until said wall is folded back upon itself in the manner as shown in Fig. 25.

Figures 28, 29, 30:
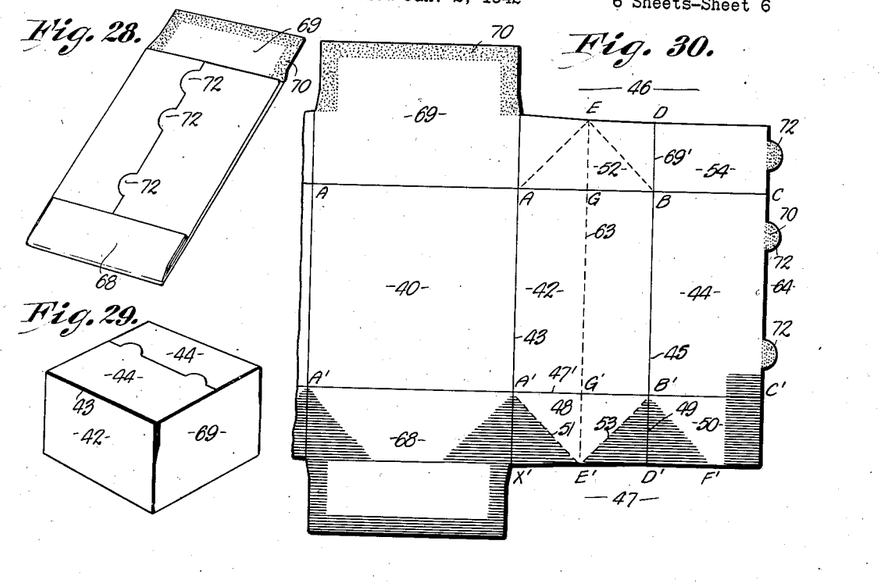

Figs. 28, 29 and 30 illustrate a modification which has very heavy reinforced side walls 56. In said species, 40 is a quadrangular blank having attached thereto, contiguous therewith and at the opposite edges thereof, and wall 42. Adjacent end wall 42 and contiguous therewith is top wall 44. Crease 43 is formed by creasing wall 42 inwardly along the line of juncture thereof with said blank 40, said line being designated as AA'. Turns 45 are formed by turning top wall 44 inwardly at its line of juncture with end wall 42, said line of juncture being designated as BB'.

Walls 42 and 44 have attached thereto along the lateral edges thereof, members 46 and 47. The line of juncture between walls 42, 44 and member 47 is designated as line A'C', said member 47 being plaited inwardly from walls 42 and 44 to form plait 47'. Member 47 is bent inwardly along the transverse median B'D' thereof, said bend B'D' being contiguous with turn 45 along line BB', the intersection of said turn and said bend 49 being designated as point B'.

The inward bend B'D' of member 47 serves to divide member 47 into a part 48 and a portion 50, part 48 being adjacent end 42 and portion 50 being adjacent top 44. Part 48 has outwardly flexed diagonal flexions 51 and 53 along lines A'E' and B'E' respectively. Flexing of part 48 outwardly on flexion 53 and inwardly on bend BD is continued until the area BED is in contact with the inside of portion 50.

When member 47 is positioned as above described, walls 42 and 44 adjacent thereto are at right angles to one another. Part 48 is then flexed outwardly on flexion 51 and inwardly on line A'E' until area A'X'E' overlies an inner portion of flap 68. Flap 68 is plaited inwardly on line A'A' whereby to overlie wall 56 formed as above described. Adhesive is placed on the inside of form 38 as indicated by the lines and secures flap 68 in position on the outside of wall 56.

The following plaits, flexions, etc., are made in the wrapping in the manner as will be described to form a side wall 59. However, the elements so formed are not secured together but are restored to their respective positions as of this present stage of forming the wrapping as specified, whereby one end of the sack wrapper will be left open. This open end will thus be pre-formed to the extent of having appropriate plaits, flexions, etc., made therein and the same may be easily reformed when the article to be wrapped is placed in the wrapping.

Member 46 is plaited inwardly from walls 42 and 44 along line AC. Member 46 is bent inwardly along the transverse median BD thereof the bend BD being contiguous with the turn 45 along line BB'—the intersection of said line and said turn being designated as point B.

The inward bend 69' of member 46 along line BD serves to divide member 46 into a part 52 and a portion 54, part 52 being adjacent end 42 and portion 54 being adjacent top 44. Part 52 is flexed along lines and diagonals corresponding to the flexions made in part 48. Portion 54 is positioned in the same relationship to part 52 as portion 50 is positioned with reference to part 48—likewise flap 69 bears the same relationship to its corresponding members as does flap 68. These elements are, however, not secured in the same manner as the elements associated to form side wall 56 but are otherwise the same in design and construction. Flap 69 has gum mixture 70 at the free edges thereof for purposes as aforesaid.

In order that the package wrapping will fold flat as shown in Fig. 28, it is necessary to restore side walls 59 and flap 69 to their original positions. An outward crook 63 is formed on line GG' and outward crooks EG and G'E' are formed as shown in Fig. 30. The sack like wrapping is collapsed by pressing end walls inwardly so as to fold the same outwardly along median line EE' until the greater part of said wall is folded back upon itself and the wrapping is in a flat position. The material is not folded along this line when the wrapping is in place on a carton as seen in Fig. 29.

Figure 31:
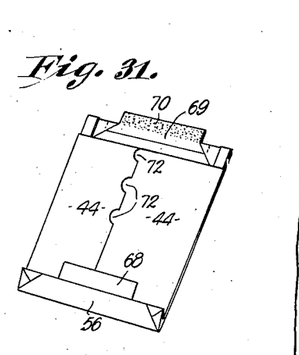
Figure 32:
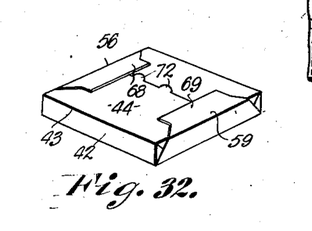
Figure 33:
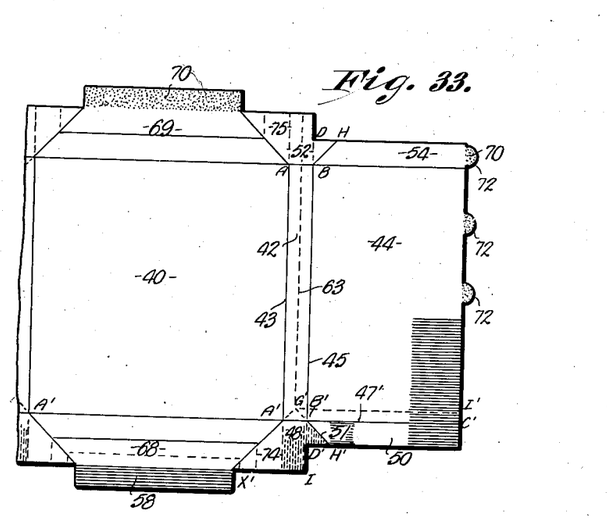

Figs. 31, 32 and 33 illustrate a modification of the invention. This modification (Fig. 33), shows a quadrangular blank 40 having attached thereto, contiguous therewith and at opposite edges thereof, end walls 42. These walls are relatively narrow and the wrapping is designed to accommodate a thin, flat article. Adjacent end walls 42 and contiguous therewith are top walls 44. Crease 43 is formed by creasing wall 42 inwardly along the line of juncture with said blank 40, said line being designated as AA'. Turn 45 is formed by turning top wall 44 inwardly at its line of juncture with end wall 42, said line of juncture being designated as BB'. Member 47 is formed along the transverse edges of walls 42 and 44. The line of juncture between walls 42, 44 and member 47 is designated as line A'C', said member 47 being plaited inwardly from walls 42 and 44 to form plait 47'. Member 74 is bent outwardly along B'D' thereof, the bend B'D' being contiguous with but opposed to the turn 45 along BB'—the intersection of said turn 45 and said bend B'D' being designated as point B'. The outward bend B'D' of member 47 along lines B'D' serve to divide member 47 into a part 48 and a portion 50.

Area X'I'D'H'G' as shown in Fig. 33 is folded inwardly along lines H'B'B'A' and A'X' and outwardly along lines B'G' and G'A'. This serves to provide a reinforcing piece for the side walls 56. The remaining area of portion 50 is then folded inwardly along line B'C' to form a side wall overlapping said reinforcing piece 74 to a degree as shown.

Flap 68 is plaited inwardly along line A'A' whereby to overlap said reinforcing piece 74 to a degree as shown. Side wall 59 is formed in exactly the same manner as side wall 56 as aforesaid, however, flap 68 is secured to top wall 44 permanently by means of adhesive 58 whereas flap 69 is secured to top wall 44 by gum mixture 70 when the wrapper is in operative position.

In order that the wrapping will fold flat as shown in Fig. 31, it is necessary to restore side walls 59 and flap 69 to their original positions. An outward crook 63 on line G'G' is incorporated in each cover section 64. Wall 42 is pressed inwardly whereby to fold outwardly along crook GG', thus permitting the top wall 44 to overlie adjacent blank 40. Side wall 56 is brought into a flat position by rotating the same about outward crook G'I' until said wall is in the position shown in Fig. 31.

Having thus described the invention what is claimed as new and desired to be secured by Letters Patent is:

1. A pre-formed package wrapping of the character described comprising a blank, end, top, and side walls, said side walls being closed at one side and open at the other said top wall comprising sections having areas in overlapped relation to each other, and means for securing the overlapped areas together throughout a portion of their length leaving the remainder unsecured to facilitate insertion of a package in the wrapping, said side walls at the open side comprising a pair of parts, a pair of portions, and a flap, and means for securing the parts, portions and flap together to form a side wall when the wrapping is placed on a package to be wrapped.

2. A pre-formed package wrapping of the character described comprising a quadrangular blank; a cover section attached to one edge of the blank, said section having end, top and two opposed side walls for covering the package; another cover section attached to the opposite edge of said blank, said other section having end, top and two opposed side walls for covering the package; and means for holding two adjacent side walls of the cover sections in overlying relationship to form a closed side of the wrapping means for holding the top walls together in overlying relationship adjacent said closed side, said other two side walls and the remaining portion of the walls being normally open before the article to be wrapped is placed within the wrapping, and means for securing said other two side walls together after the wrapping has been placed around a package.

3. A pre-formed package wrapping of the character described comprising a blank, end, top and side walls, said side walls being closed at one side and open at the other, said top wall comprising sections having areas in overlapped relation to each other, and means for securing the overlapped areas together throughout a portion of their length adjacent said closed side wall leaving the remainder unsecured to facilitate insertion of a package in the wrapper, and means for securing the remainder of said overlapped areas when the wrapping is placed on a package to be wrapped, said side walls at the open end comprising a pair of parts, a pair of portions and a flap, and means for securing the parts, portions and flap together to form a side wall when the wrapping is placed on a package to be wrapped.

4. A pre-formed package wrapping of the character described, comprising a blank, end, top and side walls, one of said side walls comprising a pair of parts, a pair of portions and a flap, and means for securing said parts, portions and flap together in overlying relationship to form a closed side wall; said top wall comprising sections having areas in overlapped relation to each other, and means for securing the overlapped areas together from the closed side wall throughout a portion of their length leaving the remainder unsecured to facilitate insertion of a package into the wrapper, and means for securing the remainder of the overlapped areas together when the wrapping is placed on a package to be wrapped, the other of said side walls being open and comprising a pair of parts, a pair of portions and a flap, and means for securing the parts, portions and flap of the open side wall together in overlying relationship after the wrapping is placed on a package to be wrapped.

BILL Y. JAMES.